United States Patent [19]
Daniels

[11] Patent Number: 5,967,008
[45] Date of Patent: Oct. 19, 1999

[54] SCREW MACHINE STOCK STOP

[75] Inventor: Mark Daniels, North Adams, Mich.

[73] Assignee: The Shane Group, Inc., Hillsdale, Mich.

[21] Appl. No.: 09/222,114

[22] Filed: Dec. 29, 1998

[51] Int. Cl.$^6$ .................................................. B23B 3/36
[52] U.S. Cl. .............................. 82/153; 82/126; 82/153
[58] Field of Search ........................... 82/126, 127, 153, 82/152

[56] References Cited

U.S. PATENT DOCUMENTS

| | | |
|---|---|---|
| 4,187,748 | 2/1980 | Evans . |
| 5,033,339 | 7/1991 | Parker . |
| 5,642,560 | 7/1997 | Roote et al. . |
| 5,676,031 | 10/1997 | Manning . |
| 5,765,448 | 6/1998 | Martelli ...................................... 74/526 |

*Primary Examiner*—William Briggs
*Assistant Examiner*—Rouzbeh Tabaddor
*Attorney, Agent, or Firm*—Young & Basile, P.C.

[57] ABSTRACT

A stock stop for screw machines and the like for determining bar stock positioning and which is capable of sensing short stock. The stock stop includes a housing affixed to the machine tool having a slidable sleeve in which a threaded stop is adjustably positioned. A spring biases the sleeve and stop toward the advancing bar and the sleeve is displaced to a stop position by the advancing bar stock. Motion multiplying means multiply the sleeve movement upon engagement by the bar stock to actuate a proximity switch indicating proper advancement of the bar stock and permitting continued machine tool operation. As the components of the stock stop are encased and protected against contamination, a high degree of reliability is attained while providing accurate machine tool control with respect to the presence of adequate bar stock for machining.

8 Claims, 3 Drawing Sheets

SCREW MACHINE STOCK STOP

BACKGROUND OF THE INVENTION

1. Field of the Invention

The invention pertains to bar stock stops for turning machines and particularly relates to bar stock stops automatically disabling the machine tool in the event of "short" stock.

2. Description of the Related Art

Stock stops for turning machines have long been used in the machine tool art and various types of stock stops of a more complex type are shown in U.S. Pat. Nos. 4,187,748; 5,033,339; 5,642,650; and 5,676,031.

However, while stock stops are available utilizing electric sensors or pneumatic or hydraulic actuating systems, such stock stops are expensive, complicated, and not as dependable as desired. Stock stops limit the axial feeding motion of bar stock prior to machining, and if insufficient bar stock length exists to properly axially position the bar stock prior to machining, damage may result to the machine tool, or a complete cycle of machining will occur producing a non-compliance part resulting in low productivity. In particular, the damage that may result from short bar stock renders the desirability of an inexpensive, dependable short stock sensing stop highly significant.

OBJECTS OF THE INVENTION

It is an object of the invention to provide a bar stop for turning machines which is capable of dependably axially locating bar stock in an automatic turning machine, and dependably sensing short bar stock so as to produce a signal which will render the machine inoperative and prevent damage in the event of bar stock of insufficient length.

Another object of the invention is to provide a bar stock stop for automatic turning machines utilizing an electric switch sensor wherein the operating mechanism for the stop and sensor is entirely enclosed, and is not subject to contamination and damage from cutting fluids, chips and the typical adverse environment to which a bar stock stop is subjected.

An additional object of the invention is to provide a bar stock stop for automatic turning machines which is capable of accurate positioning bar stock and wherein consistent operation of the stop is achieved by a simplicity of construction, with an attendant reduction in costs of manufacture.

SUMMARY OF THE INVENTION

A bar stock stop in accord with the invention includes a base for mounting upon the associated machine tool and a housing defined on the base supports sleeve structure in a slidable manner. This slide structure in the form of a non-circular sleeve is biased toward an extended position and retracted by engagement of an advancing bar to a stop position to determine the bar location during machining. The sleeve includes the threaded stem of a headed stop wherein quick adjustment of the stop is possible.

The stop includes motion multiplying apparatus in the form of a ball received within a spherical recess defined in the sleeve wherein relative small axial movement of the sleeve toward the retracted position produces significant movement of a lever which functions to control an electrical proximity switch. Once the proximity switch senses the presence of the lever, a signal is transmitted to the machine tool authorizing the machine tool to proceed with its cycling in that a proper length of bar stock has been sensed and indicated. If the advancing bar stock does not adequately retract the bar stock stop sleeve, the switch will not produce the actuating signal necessary to permit the next cycle of the machine tool.

The motion multiplying mechanism, and the proximity switch, are sealed within the housing and are not susceptible to damage from cooling fluids or careless operators. The threaded adjustment of the headed stop screw permits quick adjustment of the stop position, and as the stop is readily formed by conventional fabrication techniques, reduced costs are experienced in the process of manufacture.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
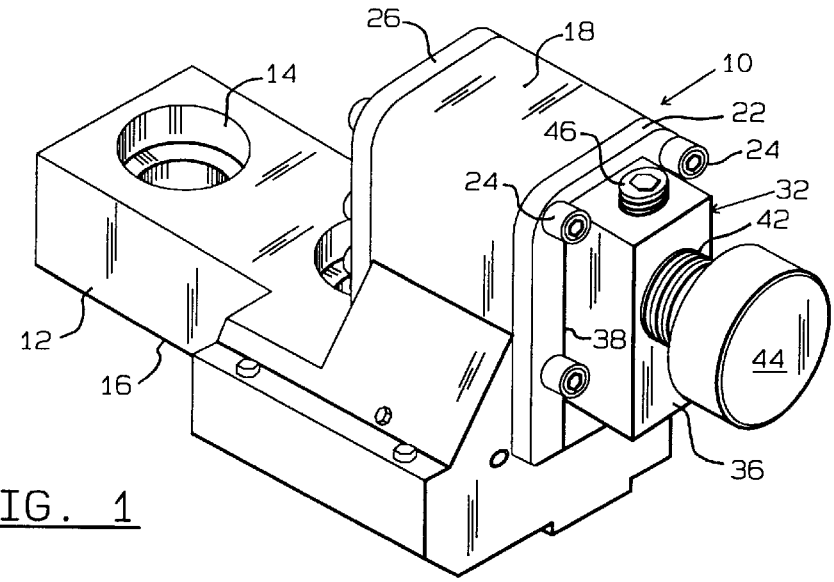
FIG. 1 is a perspective view of a bar stock stop in accord with the invention.

The overall appearance of a bar stock stop in accord with the invention will be appreciated from FIG. 1 wherein the bar stock stop is generally indicated at 10 and includes a base 12 having holes 14 defined therein intersecting the flat mounting surface 16. In this manner, the stock stop 10 may be mounted upon a turning tool in a known manner such as illustrated in U.S. Pat. Nos. 5,033,339 and 5,676,031.

Figure 2:
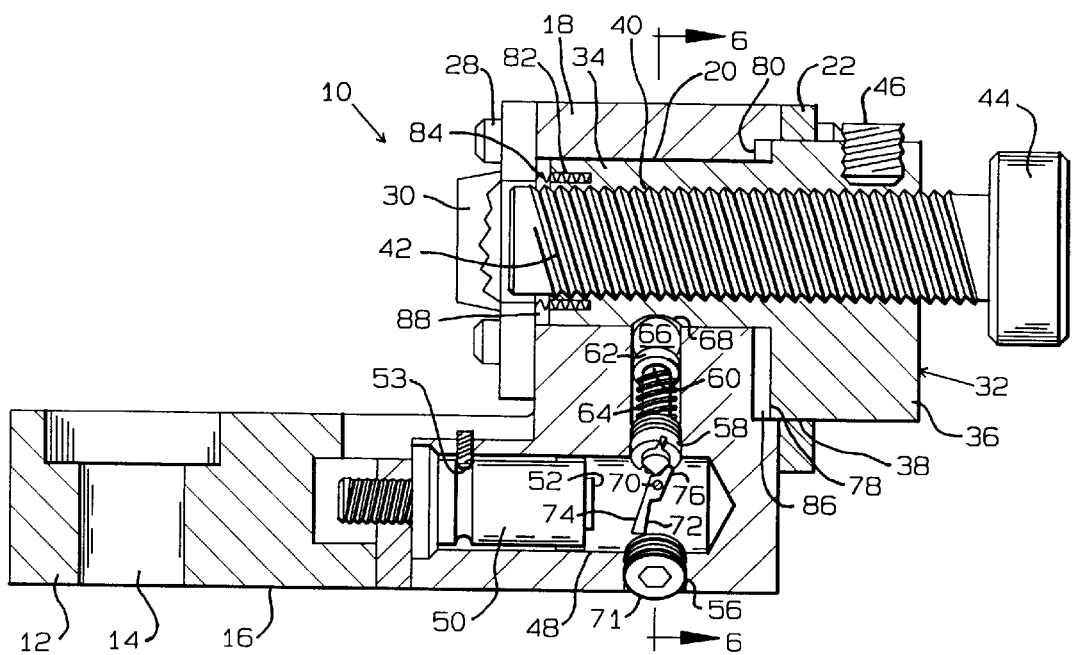
FIG. 2 is an elevational sectional view of the bar stock stop illustrating the components in the extended position adapted to receive the next advancing stock bar.
Figure 3:
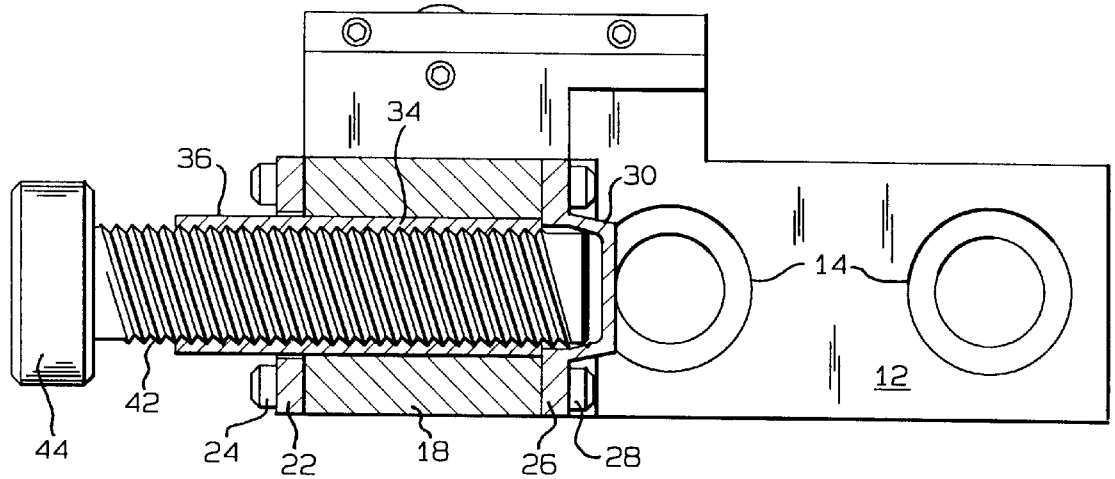
FIG. 3 is a top sectional plan view as taken along Section 3—3 of FIG. 4.

The base 12 includes a housing 18 having a rectangular bore 20 defined therein, FIG. 2. An end plate 22 is attached to the outer end of the housing 18 by screws 24, and the inner end of the housing is enclosed by the plate 26 and screws 28. An inwardly projecting boss 30 defined on the plate 26 provides clearance for the stop screw as will be later apparent.

Figure 4:
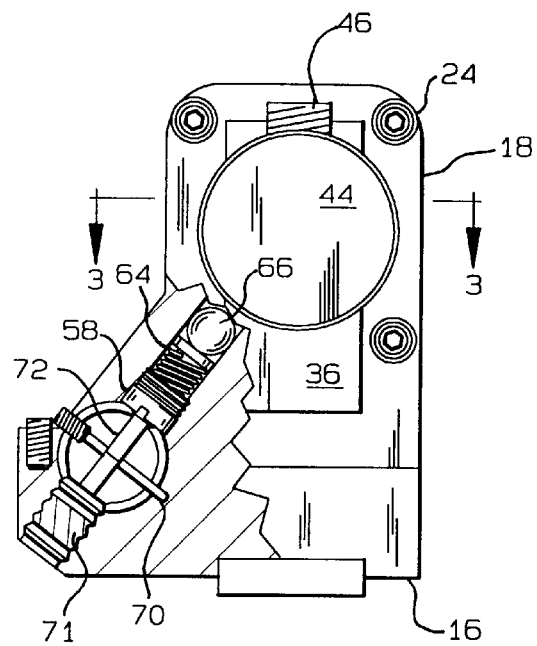
FIG. 4 is a front elevational view, partially sectioned, of the bar stock stop illustrating the motion multiplying apparatus.

A sleeve 32 is slidably mounted upon the housing 18 within the bore 20 and the sleeve 32 includes an inner portion 34 of external rectangular configuration complementary to the form of the housing bore 20 as to be slidably, yet accurately, guided therein. The sleeve 32 also includes an outer portion 36 of a rectangular configuration as will be apparent from FIGS. 1 and 4, and the outer portion 36 is slidably received within the rectangular opening 38 defined in plate 22.

The sleeve 32 is provided with a threaded bore 40 throughout its length which receives the threaded stop having stem 42 having an enlarged head 44 exteriorly defined thereon. A stop locking set screw 46 is threaded into the sleeve outer portion 36 for engaging the threads of stem 42 thereby preventing rotation of the stop stem once its position within the sleeve has been determined.

The base 12 includes a switch bore 48, FIG. 2, in which the electrical proximity switch 50 is accurately positioned. The switch 50 includes a sensor end 52 and is held in position by the screw 53 engaging a groove defined on the switch. A threaded plug 54 seals the switch bore 48.

A switch actuator bore 54 is defined in the base 12 perpendicularly disposed to the proximity switch bore 48 and the longitudinal axis of the sleeve bore 40. The switch actuator bore 56 includes a threaded annular collar 58 in which the plunger 60 is slidably mounted. The plunger 60 includes a head 62, and the head 62 and plunger 60 are biased toward the sleeve inner portion 34 by a compression spring 64 interposed between the head 62 and the threaded collar 58.

A cylindrical ball 66, such as a ball bearing, is located within the bore 56 engaging the plunger head 62, and a spherical surfaced concave recess 68 is defined in the lower exterior surface of the sleeve inner portion 34 for receiving the ball 66, FIG. 2, when the sleeve is in its extended position as shown in FIG. 2.

Figure 5:
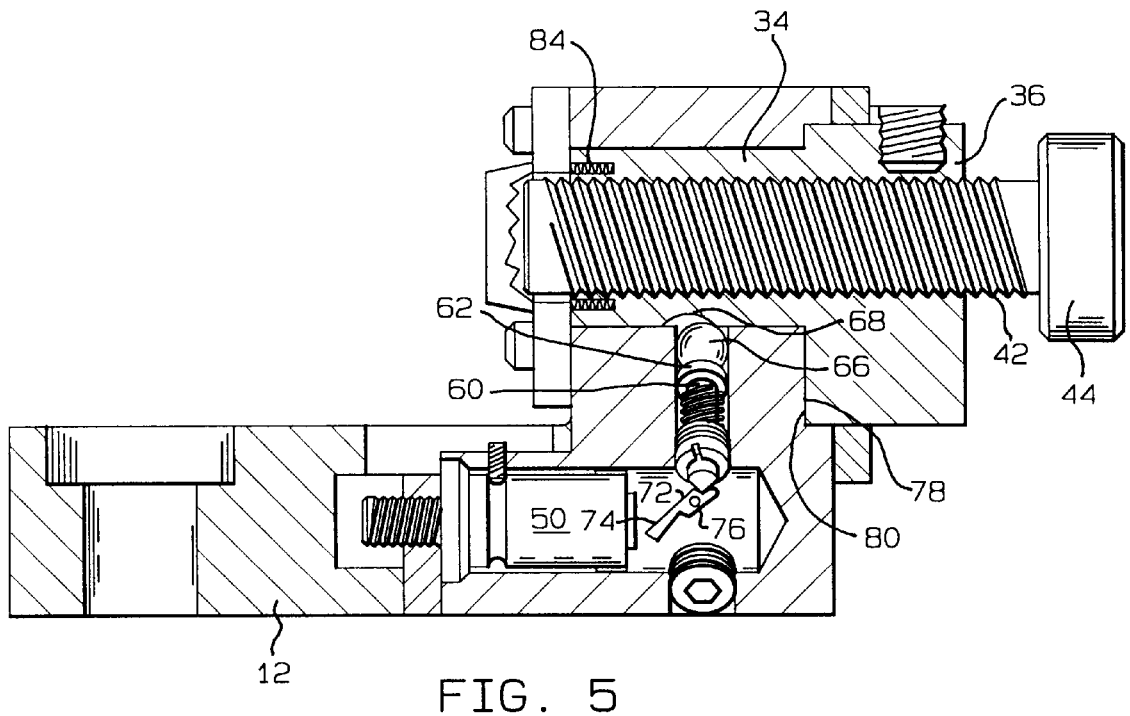
FIG. 5 is an elevational sectional view similar to FIG. 2 illustrating the bar stock stop in the retracted stock positioning relationship.
Figure 6:
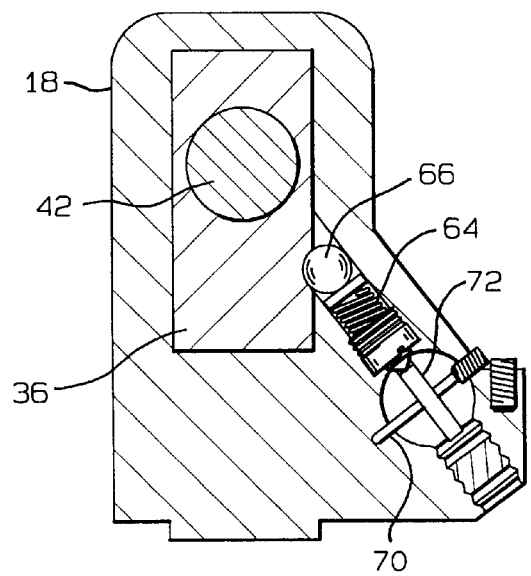
FIG. 6 is an elevational sectional view taken along Section 6—6 of FIG. 2.

A pivot pin 70 located within the base 12 supports a lever 72, FIGS. 2 and 5, having an end 74 located toward the proximity switch 50, and the other end of the lever 72 is represented at 76 and is in alignment with the conical end of plunger 60. As will be appreciated from the drawings, the pivot pin 70 is located much closer to the lever end 76 than it is to the lever end 74 wherein movement of the lever by engagement of the plunger 60 with the end 76 multiplies the movement of the lever end 74 relative to the proximity switch 50.

A flat stop surface 78 is defined on the sleeve outer portion 36, FIG. 2, and an opposed stop shoulder 80 is defined on the housing 18, FIG. 2. A pair of spring recesses 82 are defined in the inner end of the sleeve inner portion 34, FIG. 2, and compression springs 84 located within spring recesses 82 bias the sleeve 32 and stop stem 42 and head 44 toward its extended position as shown in FIG. 2. In this extended position, a gap between stop surface 78 and stop shoulder 80 exists, FIG. 2, while a gap 88 will exist between the end of the sleeve inner portion 34 and the plate 26.

In use, the bar stock stop 10 will be mounted upon an automatic turning tool, not shown, in the known manner, by fasteners extending through the holes 14. The stop 10 will be aligned with a collet or spindle through which advancing bar stock is fed, and the bar stock will engage the head 44 as it is advanced. It will be understood that, initially, the stop apparatus will be in its extended position as shown in FIG. 2. Under the biasing influence of the spring 84, the sleeve 36 will be biased toward the right, FIG. 2, and the gaps 86 and 88 will exist between the sleeve and housing 18. This movement of the sleeve 32 to the right is terminated upon the ball 66 entering the recess 68. Upon the ball 66 fully entering the recess 68, the plunger 60 will be in the position shown in FIG. 2 and the conical end of the plunger 60 will permit the lever 72 to pivot to its greatest counterclockwise position as shown in FIG. 2 wherein the lever end 74 will be positioned its greatest distance from the proximity switch end 52, and the lever end 74 will not be sensed by the switch 50 which is in an open condition.

Upon the bar stock engaging the head 44, the sleeve 32 is biased to the left, FIG. 5, causing the surfaces 78 and 80 to engage and eliminating the gaps 86 and 88. Of course, the threaded stop stem 42 is accurately located within the sleeve 32 so that when the surfaces 78 and 80 engage, the bar stock will be accurately located as desired for the subsequent machining operations of the bar stock.

Upon the stop stem 42 and sleeve 32 moving to the left, FIG. 5, to the fully retracted position, the sleeve recess 68 will have moved relative to the ball 66 as shown in FIG. 5 which causes the recess to "cam" the ball 66 downwardly so that the conical end of the plunger 60 engages the lever end 76 causing a clockwise rotation of the lever which swings the lever end 74 close enough to the proximity switch sensor end 52, FIG. 5, to cause the proximity switch to actuate and close its contacts. This closing of the switch 50 provides a signal to the machine tool that a proper length of bar stock has been inserted against the stop 10 and permits further cycling of the machine tool to produce the subsequent machining operations. After the bar stock has been moved out of alignment with the stop 10, the spring 84 will again bias the sleeve 32 to the right to the position shown in FIG. 2 readying the stop for its next bar stock positioning cycle.

In the event that the bar stock in alignment with stop 10 is too short to axially displace the sleeve 32 from its extended position of FIG. 2 to the retracted stop position of FIG. 5, the contacts of the switch 50 will remain open preventing the machine tool from cycling, and the operator will immediately realize that new bar stock must be added to the machine tool.

As the stop 10 of the invention automatically prevents operation of the turning tool if an improper length of bar stock has been advanced, damage to the machine tool as may occur if a proper length of bar stock is not available is prevented. Because the operating mechanism of the bar stock stop 10 is enclosed within the base 12 and housing 18, the components of the stop are not exposed to the highly corrosive atmosphere in which the stop is mounted, and the hot chips and coolant fluids to which the stop 10 is subjected do not adversely affect the stop operation and bar stock stops constructed in accord with the invention perform dependably and accurately over extended time periods.

It is appreciated that various modifications to the inventive concepts may be apparent to those skilled in the art without departing from the spirit and scope of the invention.

I claim:

1. A stock stop for turning machine tools for determining the axial position of advancing bar stock comprising, in combination, a base, means defined on said base for attaching said base to a turning machine tool, a housing defined on said base, a bore defined in said housing, a hollow sleeve slidably mounted in said housing axially movable between extended and bar stop positions, said sleeve having a threaded bore, a threaded stop screw threaded into said sleeve bore having an exterior head adapted to be engaged by the end of advancing bar stock, stops associated with said sleeve axially retaining said sleeve at said extended and bar stop positions, an electrical proximity switch mounted on said base, and motion multiplying switch operating means mounted on said base operatively associated with said sleeve and said switch operating said switch in accordance with the position of said sleeve.

2. In a stock stop as in claim 1, said motion multiplying switch operating means including a lever having first and second ends, a pivot pivotally supporting said lever, said first lever end being selectively movable within operating distance of said proximity, a lever actuator interposed between said sleeve and said lever second end selectively engaging said lever second end to pivot said lever, said pivot supporting said lever being located closer to said lever second end than to said lever first end whereby movement of said second end produces a greater movement of said first end.

3. In a stock stop as in claim 2, a concave recess defined in said sleeve, a convex member received within said recess, said lever actuator comprising a plunger engaging said convex member whereby axial movement of said sleeve upon engagement of bar stock with said threaded stop axially displacing said sleeve from said extended position to said bar stop position forces said convex member from said recess moving said plunger to engage said lever second end.

4. In a stock stop as in claim 3, a spring located in said housing interposed between said housing and said spring axially biasing said sleeve toward said extended position.

5. In a stock stop as in claim 1, said sleeve including a stop surface substantially perpendicular to the direction of movement of said sleeve, and a stop shoulder defined on said housing in opposition to said stop surface, said stop surface and said stop shoulder engaging to define said sleeve bar stop position.

6. In a stock stop as in claim 5, a set screw mounted in said sleeve selectively engaging said stop screw to prevent relative rotation between said sleeve and stop screw.

7. In a stock stop as in claim 1, said proximity switch and said motion multiplying switch operating means all being sealed within said housing.

8. A stock stop for turning machine tools for determining the axial position of advancing bar stock comprising, in combination, a base, means defined on said base for attaching said base to a turning machine tool, a housing defined on said base, a bore defined in said housing, a hollow sleeve slidably mounted in said housing axially movable between extended and bar stop positions, said sleeve having a threaded bore, a threaded stop screw threaded into said sleeve bore having an exterior head adapted to be engaged by the end of advancing bar stock, stops associated with said sleeve axially retaining said sleeve at said extended and bar stop positions, an electrical proximity switch mounted on said base, switch operating means mounted on said base operatively associated with said sleeve and said switch operating said switch in accordance with the position of said sleeve, and a spring located in said housing interposed between said housing and said sleeve axially biasing said sleeve toward said extended position.

* * * * *